(12) United States Patent
Heudorfer et al.

(10) Patent No.: US 6,394,487 B1
(45) Date of Patent: May 28, 2002

(54) INFLATABLE AIRBAG

(75) Inventors: Benedikt Heudorfer, Nersingen; Ulrich Karlbauer; Jochen Maidel, both of Ulm, all of (DE)

(73) Assignee: Takata (Europe) Vehicle Safety Technology GmbH, Ulm (DE)

(*) Notice: Subject to any disclaimer, the term of this patent is extended or adjusted under 35 U.S.C. 154(b) by 0 days.

(21) Appl. No.: 09/722,252

(22) Filed: Nov. 27, 2000

(30) Foreign Application Priority Data

Nov. 25, 1999 (DE) .......................... 199 56 710

(51) Int. Cl.⁷ .......................... B60R 21/22; B60R 21/24
(52) U.S. Cl. .................... 280/729; 280/730.2
(58) Field of Search .............. 280/729, 730.2, 280/743.1, 749

(56) References Cited

U.S. PATENT DOCUMENTS

| | | | | |
|---|---|---|---|---|
| 6,056,316 A | * | 5/2000 | Yamaji et al. | 280/730.2 |
| 6,082,761 A | * | 7/2000 | Kato et al. | 280/730.2 |
| 6,168,191 B1 | * | 1/2001 | Webber et al. | 280/730.2 |
| 6,170,860 B1 | * | 1/2001 | Denz et al. | 280/729 |
| 6,199,898 B1 | * | 3/2001 | Masuda et al. | 280/729 |
| 6,260,878 B1 | * | 7/2001 | Tanase | 280/730.2 |

FOREIGN PATENT DOCUMENTS

| | | |
|---|---|---|
| DE | 296 14 201 U1 | 9/1996 |
| DE | 298 14 990 U1 | 12/1998 |
| DE | 299 07 622 U1 | 9/1999 |

* cited by examiner

*Primary Examiner*—Peter C. English
(74) *Attorney, Agent, or Firm*—Foley & Lardner

(57) ABSTRACT

An inflatable airbag for a motor vehicle is provided. The airbag includes a main chamber configured to be connected to a gas generator. The airbag is arranged so that when the airbag is inflated at least a portion of the main chamber covers a side wall of the vehicle. The airbag may further include an additional airbag region configured to form an approximately spherically shaped chamber when inflated. The spherically shaped chamber may be configured to be inflated via the main chamber. The spherical chamber provides for an advantageous shortening of the airbag when the airbag is inflated when compared to the dimensions of the airbag in its spread out or uninflated state.

18 Claims, 4 Drawing Sheets

INFLATABLE AIRBAG

BACKGROUND OF THE INVENTION

The invention relates to an inflatable airbag for motor vehicle airbags. More particularly, the invention relates to airbags that protect a vehicle passenger from side impact collisions. Known airbags which are, for example, accommodated in the steering wheel or in the dashboard of a vehicle protect the vehicle passenger in the event of a frontal impact. Airbags of this kind do not offer protection in a side-on collision or in a rolling over of the vehicle to the side.

Therefore, there remains a need to create an inflatable airbag which provides protection for the vehicle passenger in the case of a side-on collision or during a rolling over of the vehicle to the side.

SUMMARY OF THE INVENTION

According to an embodiment of the present invention an inflatable airbag for a motor vehicle is provided. The airbag includes a main chamber configured to be connected to a gas generator. The airbag is arranged so that when the airbag is inflated at least a portion of the main chamber covers a side wall of the vehicle.

The airbag may further include an additional airbag region configured to form an approximately spherically shaped chamber when inflated. The spherically shaped chamber may be configured to be inflated via the main chamber. In addition, the spherically shaped chamber may be configured so that in an inflated state the volume of the spherical chamber is smaller than the volume of the main chamber. The airbag may include a pair of layers of material which are sewn together and arranged so that the boundaries of the main chamber and of the spherically shaped chamber are formed by a sewn seam. Preferably, the boundaries of the chambers are formed by a single common seam.

The airbag may also include an additional airbag region configured to form a downward extending chamber when inflated, the extending chamber extending downwardly below a lower window boundary of the vehicle side wall. The air bag may be arranged so that the boundaries of the main chamber and the downward extending chamber are formed by a sewn seam. Preferably, the boundaries of the main chamber and the downward extending chamber are formed by a single common seam.

The main chamber of the airbag may include a strip shaped constriction that connects with the boundary of the main chamber. The constriction may be in the form of a quilting having an approximately U-shaped seam. The quilting may connect to a seam which forms the boundary of the main chamber and is incident to the seam at an angle between approximately 45 to 90 degrees. More preferably, an approximately circular seam may be connected to an end of the U-shaped seam.

According to an alternative embodiment of the present invention an airbag module for motor vehicles is provided. The airbag module includes a gas generator and an inflatable airbag. The airbag comprises a main chamber configured to be connected to the gas generator. The airbag is configured so that when the airbag is inflated at least a portion of the main chamber covers a side wall of the vehicle. Preferably, the airbag module includes an additional airbag region configured to form an approximately spherically shaped chamber when inflated. In addition, the module may include a second additional airbag region configured to form a downward extending chamber when inflated, the extending chamber extending downwardly below a lower window boundary of the vehicle side wall.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiment shown in the drawings, which are briefly described below.

DETAILED DESCRIPTION

Figure 1:
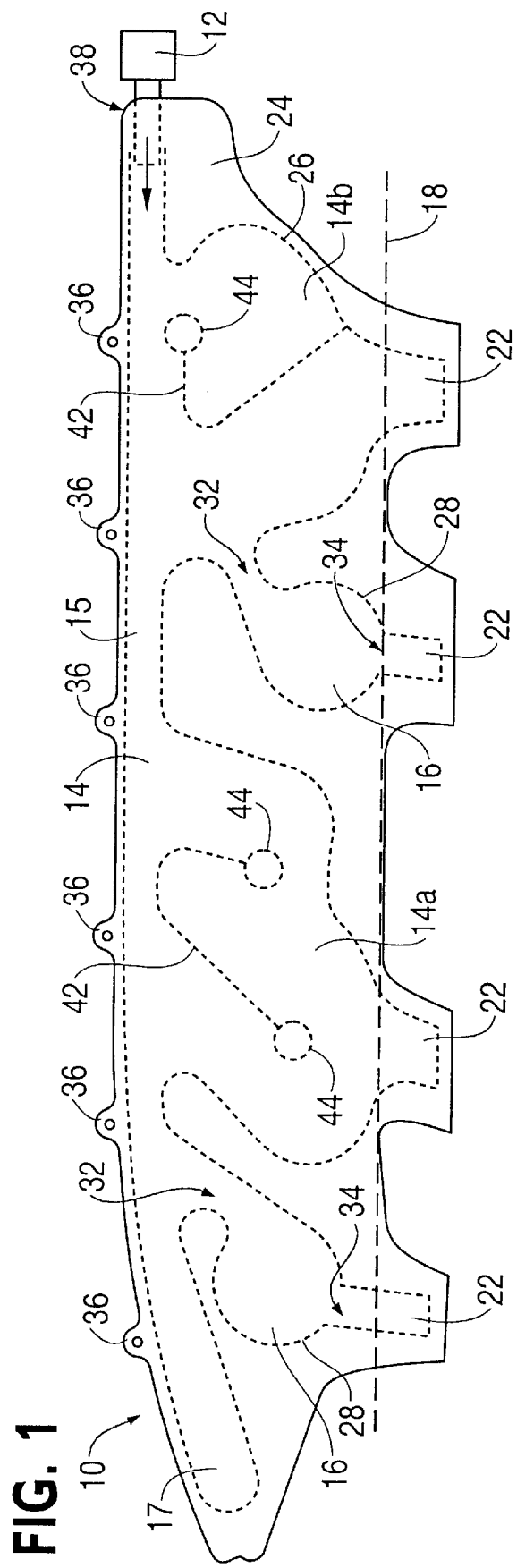
FIG. 1 is a side view in elevation of an inflatable airbag according to a first embodiment of the present invention.

The present invention is directed to an inflatable airbag that includes at least one main chamber. The chamber is configured to be connected to a gas generator and to be positioned to cover at least a portion of a side wall of the vehicle when inflated. When inflated the airbag provides a protective cushion between a passenger in the vehicle and the vehicle side wall and offers the vehicle passsenger both a side-on impact protection and a roll-over protection.

In a particularly preferred exemplary embodiment of the invention at least one additional airbag region is present, which forms an at least approximately spherical chamber in the inflated state. The spherical chamber provides for an advantageous shortening of the airbag when the airbag is inflated when compared to the dimensions of the airbag in its spread out or uninflated state. The shortening of the airbag results in a stiffer inflated airbag. The airbag has increased stability and an increased retention effect, thus improving the protective action provided by the airbag.

The spherical chamber has the substantial advantage of providing maximum shortening of the airbag dimensions for a given volume. The spherical chamber is preferred over, for example, cylindrical or tubular chamber sections which have a smaller surface for the same volume. As described above, the spherical chambers provide for the largest decrease in the dimensions of the air bag when inflated and as a result, the greatest tautening or tensioning of the inflated airbag.

The air bag may include at least one additional airbag region which in the inflated state forms a chamber extension which extends downwardly in the vehicle further than the adjacent chamber regions and which reaches to below the lower window boundary. Due to the downward extending chamber the airbag can brace itself in the inflated state at the door breastwork or side wall breastwork of the vehicle which forms the lower window boundary. The ability of the airbag to retain and protect the passenger is thus increased, because the respective vehicle passenger is held safely within the vehicle interior by the airbag, which is braced with its lower end at the door or side wall respectively below the window.

It is preferred that the airbag include at least two layers which are sewn to one another. The outlines of the main chamber as well as of the spherical chamber and/or of the chamber extension are formed by at least one seam when the airbag is spread out. Preferably, the outlines of the main chamber as well as of the spherical chamber and/or of the chamber extension are formed by a single common seam. This design allows for the outlines of the individual chambers or chamber regions respectively of the airbag and thus the shape of the airbag in its inflated state to be predetermined in a simple way through the course of the seam made during the sewing together of the airbag layers.

The airbag may also include a line shaped or strip shaped constriction located in a relatively large section of the main chamber. The constriction can be formed by a quilting in the form of a seam, which can for example be executed to be approximately U-shaped and at the ends of which in each case an approximately circular seam is applied. The quilting can also extend up to the outline of the main chamber and intersect with the seam which forms the outline of the main chamber at a large angle of between 45 and 90 degrees, for example. Alternatively, it is possible to apply a circular seam merely to the free end of the quilting. Through the placement of the constriction the main chamber is subdivided into different regions, thus providing an advantageous additional stiffening of the airbag in the inflated state results.

As shown in FIG. 1, an airbag 10 that is a constituent part of a motor vehicle side airbag is provided. The airbag 10 can be attached in a folded state in the region of the transition between the side wall and the roof of a vehicle. In the event of an accident the airbag 10 deploys downwardly in the manner of a curtain and forms a protective cushion between the vehicle inner wall and the respective vehicle passenger.

The airbag 10, which is shown in FIG. 1 in the spread out, non inflated state, comprises two layers of material 24 which are sewn together. The layers of material 24 may also be referred to as lobes or panels. The layers 24 may include securing regions 36 which are positioned in the upper portion of the airbag 10 and are spaced apart in the longitudinal direction. The airbag 10 can, for example, be attached to a retainer device by screws passed through the securing regions. The retainer device may in turn be secured to the vehicle. Alternatively, the airbag 10 can be secured to the vehicle directly by fasteners passed through the securing regions 36.

The length of the airbag 10 is dimensioned in such a manner that it extends substantially along the entire vehicle interior and thus offers protection for both persons sitting in the front and in the rear of the vehicle. Alternatively, the airbag in accordance with the invention can also be provided only for the front or the rear region and be correspondingly shorter.

The airbag 10 in FIG. 1 has a main chamber 14 and two spherically shaped chambers 16. The airbag 10 may also include four downward extending chambers 22. The outline or boundary of the main chamber 14, spherically shaped chambers 16 and the four downward extending chambers 16 may be formed by a single common sewn seam 26. The seam 26 may be the same seam used to sew the airbag layers 24 together. The airbag 10 includes a gas inlet 38 for connecting to a gas generator 12. In the region of the gas inlet 38 the seam 26 is interrupted for connecting the airbag 10 to the gas generator 12, as shown in FIG. 1.

The chamber 16, which are generallly spherically shaped when inflated, are bounded by a circular seam section 28 of the seam 26. The seam section 28 is configuerd to form an opening for a gas inlet 32. The gas inlet 32 connects the spherical chamber 16 with the main chamber 14. The seam section 28 may also be arranged to form an outlet region 34 at the point where one of the chamber extensions 22 adjoins at the spherical chamber 16. Thus, as shown in FIG. 1, the spherical chambers 16 are inflatable via the main chamber 14 and the chamber extensions 22 which are connected to the spherical chambers 16 are inflatable via the spherical chambers 16.

The other two downward extending chambers 22 adjoin to large chamber sections 14a and 14b of the main chamber 14. The downward extending chambers 22 adjoined to the large chamber sections 14a, 14b are inflated through the large chamber sections, and have a larger volume in the inflated state of the airbag 10 than the downward extending chambers 22 attached to the spherically shaped chambers 16.

At least one spherical chamber 16 may be connected with its gas inlet 32 to a narrow main chamber section 15 which extends between the chamber sections 14a, 14b along the upper airbag side, as shown in FIG. 1. In addition, the airbag 10 includes an elongated chamber 17 extending generally longitudinally toward an end of the airbag and fluidly connected to the main chamber 14.

The lower window boundary 18, i.e. the upper end of the door breastwork or side wall breastwork respectively of the vehicle is illustrated by the broken line in FIG. 1. The airbag 10 may be dimensioned in its height so that in the state of being mounted in the vehicle and inflated, the chamber extensions 22 which start from the spherical chambers 16 and from the large chamber sections 14a, 14b extend below the lower window boundary 18. Thus, when the airbag 10 is inflated it overlaps the vehicle side wall below the windows. Therefore, the inflated airbag 10 is braced with its chamber extensions 22 at the door breastwork or side wall breastwork or door lining or side wall lining of the vehicle, so that it can not be pushed out of the vehicle. As shown in FIG. 1, with the exception of the downward extending chambers 22 all inflatable regions of the airbag 10 lie above the window boundary 18.

The shortening of the airbag 10 which arises during inflation is most pronounced around the spherical chambers 16. Due to the use of spherically shaped chambers, the airbag 10 shortens in length during inflation a significant amount in relation to a unit volume, so that the amount of gas which is required for a specific shortening action is comparatively low. More gas is therefore available for the larger chamber sections 14a, 14b of the airbag 10.

In the region of the large chamber sections 14a, 14b of the main chamber 14, the airbag layers 24 are sewn to one another by a quilting which is provided in the form of an approximately U-shaped seam 42. In the quilting in the main chamber section 14a which is on the left in FIG. 1, a closed circular seam 44 is applied at the ends of the seam 42.

The quilting in the right main chamber section 14b is formed by a seam 42, which includes at its free end a circular finishing seam 44. The seam 42 intersects with the seam 26 which forms the outline of the main chamber 14. As a result, gas flows between the regions of the main chamber section 14b separated from one another by the quilting. Alternatively, more than two quiltings could also be provided, and it is also possible to form all quiltings similarly, i.e. only as quiltings which are incident with one end onto the main chamber outline or only as quiltings which have two free ends (see, for example, FIG. 2). Through quiltings of this kind an additional stiffening and thus a stabilization of the inflated airbag 10 is achieved, through which its ability to retain and protect the passenger is increased. The shape of the quiltings 42, 44 can also deviate from the U-shape such as, for example, shown in FIG. 1.

Alternatively, it is also possible in accordance with the invention to arrange the spherical chambers 16 in such a manner that at the same time in the inflated state in the vehicle they form chamber extensions which reach to below the lower window boundary 18. Through chamber sections of this kind an effective shortening and tensioning of the airbag 10 and at the same time a bracing at the door breastwork or side wall breastwork is then in each case achieved.

Figure 2:
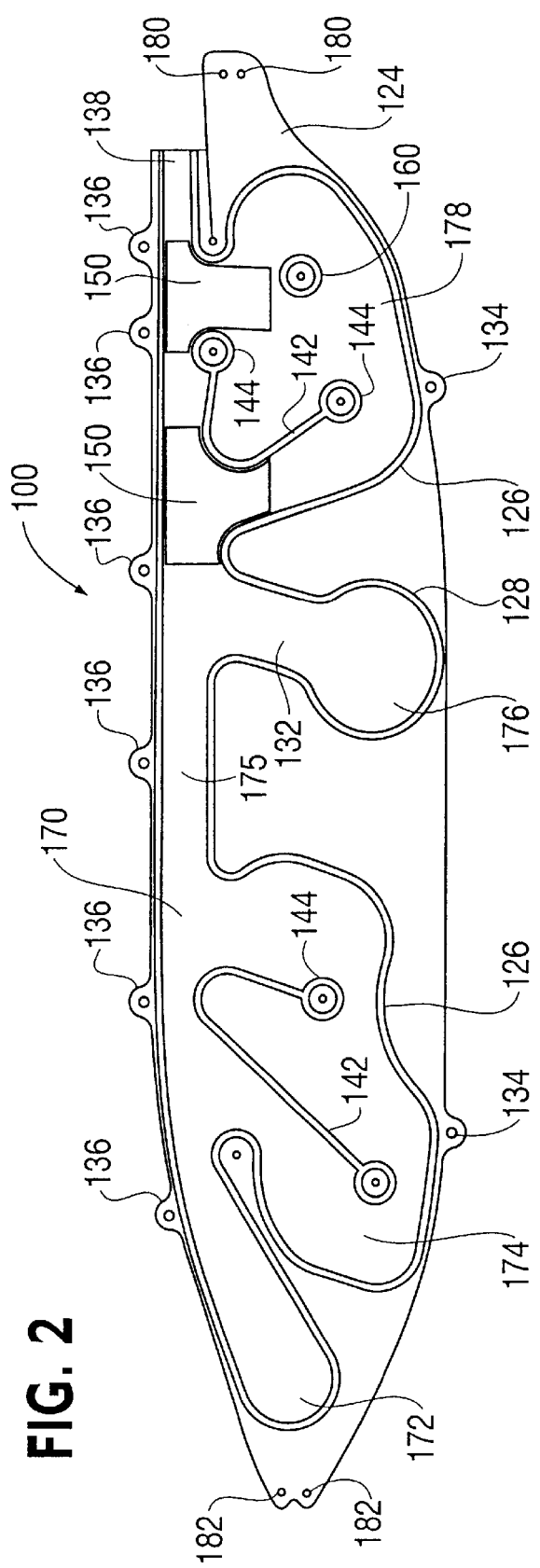
FIG. 2 is a side view in elevation of an inflatable airbag according to a second embodiment of the present invention.

An alternative embodiment of the present invention is shown in FIG. 2. The airbag 100, which is shown in FIG. 2 in the spread out, non inflated state, comprises two layers of material 124 which are sewn together. The layers of material 124 may also be referred to as lobes or panels. The layers 124 may include securing regions 136 which are positioned in the upper portion of the airbag 100 and are spaced apart in the longitudinal direction. The layers also include lower securing regions 134 positioned on the lower portion of the air bag. In addition, the air bag layers 124 may include fore and aft connecting holes 180, 182 for attaching the air bag to the vehicle. The airbag 100 can, for example, be attached to a retainer device by screws passed through the securing regions and holes. The retainer device may in turn be secured to the vehicle. Alternatively, the airbag 100 can be secured to the vehicle directly by fasteners passed through the securing regions 134, 136 and connecting holes 180, 182.

The length of the airbag 100 is dimensioned in such a manner that it extends substantially along the entire vehicle interior and thus offers protection for both persons sitting in the front and in the rear of the vehicle. Alternatively, the airbag in accordance with the invention can also be provided only for the front or the rear region and be correspondingly shorter.

The airbag 100 shown in FIG. 2 includes a main chamber 170. The main chamber 170 is divided into a pair of large chambers 174, 178 and a spherically shaped chamber 176. A narrow longitudinal section 175 of the main chamber 170 is positioned between the spherically shaped chamber 176 and one of the large chambers 174. The airbag 100 may also include an finger shaped chamber 172 extending generally longitudinally toward an end of the air bag adjacent the securing holes 182, as shown in FIG. 2. The outline or boundary of the main chamber 170 including the pair of large chambers 174, 178 and the spherically shaped chamber 176 may be formed by a single common sewn seam 126. The seam 126 may be the same seam used to sew the airbag layers 124 together. The airbag 100 includes a gas inlet 138 for connecting to a gas generator. In the region of the gas inlet 138, the seam 126 is interrupted for connecting the airbag 100 to the gas generator.

The chamber 176, which is preferably generally spherically shaped when inflated, is bounded by a circular seam section 128 of the seam 126. The seam section 128 is configured to form an opening for a gas inlet 132. The gas inlet 132 connects the spherical chamber 176 with the main chamber 170. Thus, as shown in FIG. 1, the spherical chamber 176 is inflatable via the main chamber 170.

The airbag 100 may extend downward to a position either above or below the lower window boundary, i.e. the upper end of the door breastwork or side wall breastwork respectively of the vehicle as illustrated by the broken line in FIG. 1. When extended below the lower window boundary, the inflated airbag 100 is braced at the door breastwork or side wall breastwork or door lining or side wall lining of the vehicle, so that it can not be pushed out of the vehicle.

The shortening of the airbag 100 which arises during inflation is most pronounced around the spherical chamber 176. As described above, with reference to FIG. 1, due to the use of the spherically shaped chamber the airbag 100 shortens in length during inflation a significant amount in relation to a unit volume, so that the amount of gas which is required for a specific shortening action is comparatively low. More gas is therefore available for the larger chamber sections 174, 178 of the airbag 100.

In the region of the large chamber sections 174, 178 of the main chamber 170 the airbag layers 124 are sewn to one another by a quilting which is provided in the form of an approximately U-shaped seam 142. In the quilting in the larger chamber section 174 which is on the left in FIG. 2, a closed circular seam 144 is applied at the ends of the seam 142. A similar arrangement is provided in the large chamber section 178 on the right of FIG. 2. In addition, as shown in FIG. 2, a closed circular seam 160 may be provided in either chamber section 174, 178 in order to connect the layers 124 together. The large chamber 178 is not divided fully by the quilting seari 142, thus improving gas fluency within the chamber and increasing the capability of the chamber to absorb energy from impact. In addition, this arrangement allows both portions of chamber 178 to inflate smoothly and quickly. Further quilting arrangements may be provided, as discussed above with reference to FIG. 1, for example.

The airbag 100 may also include reinforcement sheets 150, as shown in FIG. 2. The reinforcement sheets provide further stability and strength to the airbag material.

Figure 3:
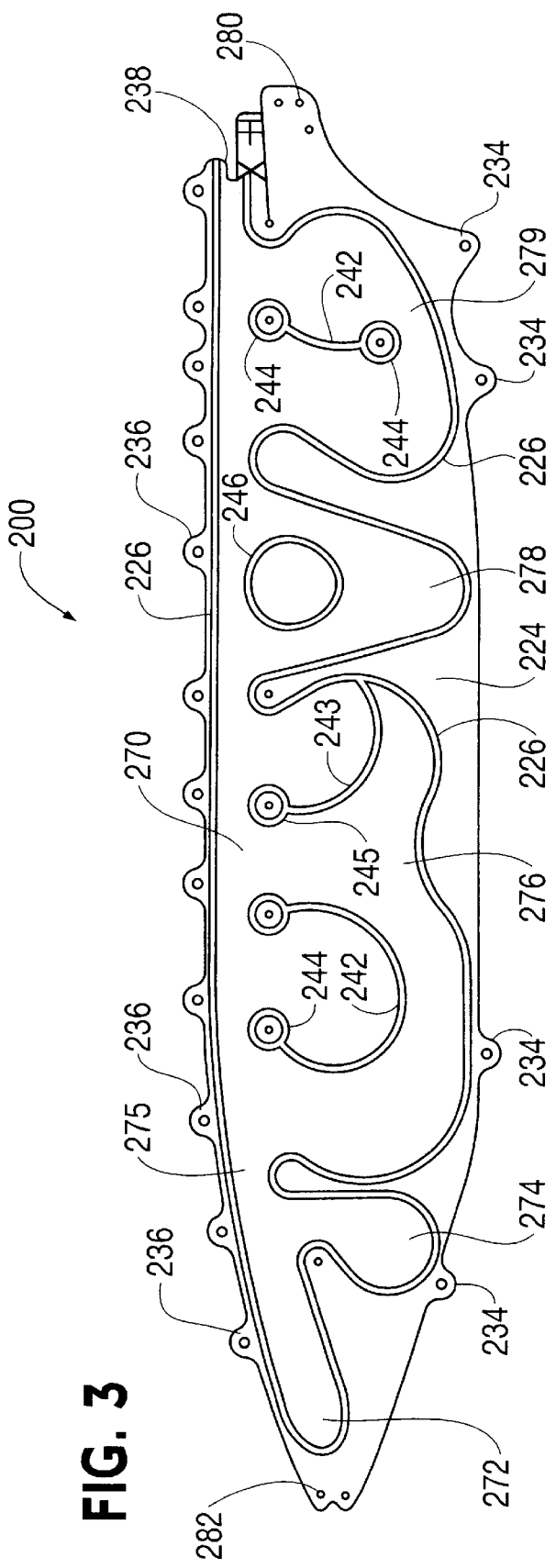
FIG. 3 is a side view in elevation of an inflatable airbag according to a third embodiment of the prersent invention.

A third alternative embodiment of the present invention is shown in FIG. 3. The airbag 200, which is shown in FIG. 3 in the spread out, non inflated state, comprises two layers of material 224 which are sewn together. The layers of material 224 may also be referred to as lobes or panels. The layers 224 may include upper securing regions 236 which are positioned in the upper portion of the airbag 200 and are spaced apart in the longitudinal direction. The layers also include lower securing regions 234 positioned on the lower portion of the air bag. In addition, the air bag layers 224 may include fore and aft connecting holes 280, 282 for attaching the air bag to the vehicle. The airbag 200 can, for example, be attached to a retainer device by screws passed through the securing regions and holes. The retainer device may in turn be secured to the vehicle. Alternatively, the airbag 200 can be secured to the vehicle directly by fasteners passed through the securing regions 234, and 236 and connecting holes 280, 282.

The length of the airbag 200 is dimensioned in such a manner that it extends substantially along the entire vehicle interior and thus offers protection for both persons sitting in the front and in the rear of the vehicle. Alternatively, the airbag in accordance with the invention can also be provided only for the front or the rear region and be correspondingly shorter.

The airbag 200 shown in FIG. 3 includes a main chamber 270. The main chamber 270 is divided into a large chamber 276 and several smaller chambers 272, 274, 278 and 279. The outline or boundary of the main chamber 270 may be formed by a single common sewn seam 226. The seam 226 may be the same seam used to sew the airbag layers 224 together. One of the smaller chambers is a finger shaped chamber 272 that extends generally longitudinally toward an end of the air bag adjacent the securing holes 282, as shown in FIG. 3. A generally spherical chamber 274 is positioned adjacent to the finger shaped chamber 272. A gas outlet or passage 275 is provided to allow for inflation gas to reach these chambers after passing through the adjacent large chamber 276.

The airbag 200 includes a gas inlet 238 for connecting to a gas generator. In the region of the gas inlet 238, the seam 226 is interrupted for connecting the airbag 200 to the gas generator.

The airbag 200 may extend downward to a position either above or below the lower window boundary, i.e. the upper end of the door breastwork or side wall breastwork respectively of the vehicle as illustrated by the broken line in FIG. 1. When extended below the lower window boundary, the inflated airbag 200 is braced at the door breastwork or side wall breastwork or door lining or side wall lining of the vehicle, so that it can not be pushed out of the vehicle.

The large chamber 276 includes a quilting which is provided in the form of an approximately U-shaped seam 242. In the large chamber 276, a closed circular seam 244 is applied at the ends of the seam 242. A similar arrangement is provided in the end chamber 279 on the right of FIG. 3. In addition, as shown in FIG. 3, a closed seam 246 may be provided in the small chamber 278 in order to connect the layers 224 together. The large chamber 276 may also include a seam 243 connecting a closed circular seam 245 to the main chamber seam 226.

Figure 4:
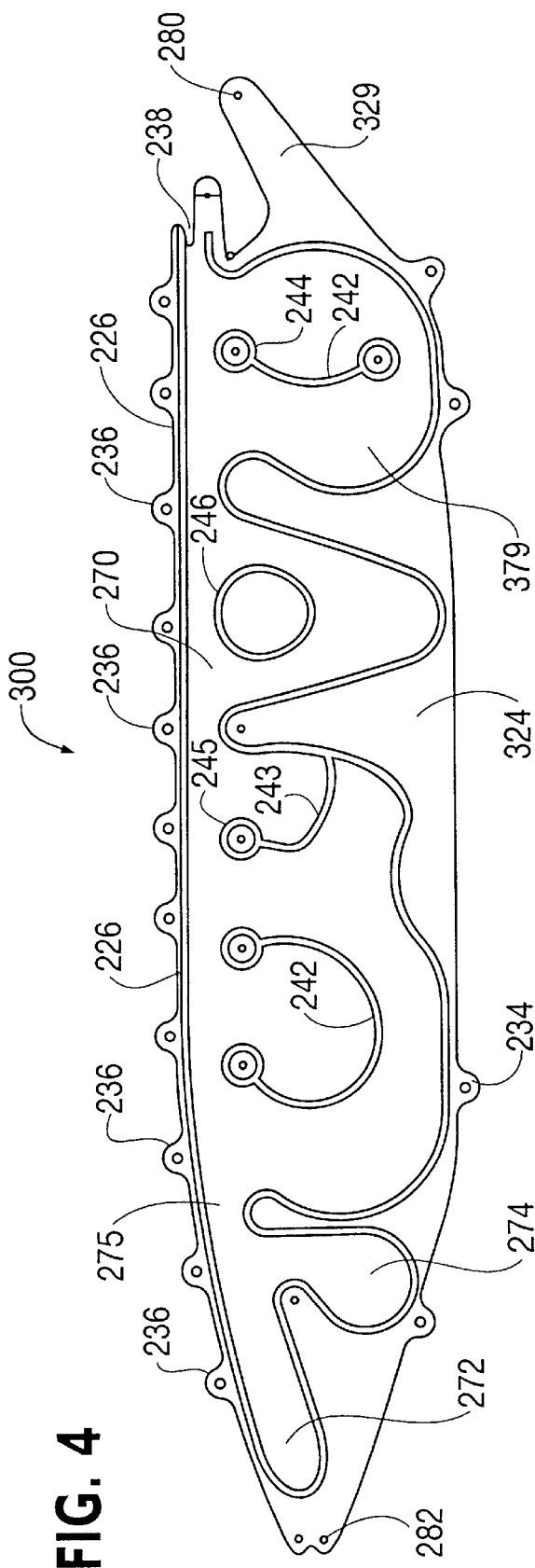
FIG. 4 is a side view in elevation of an inflatable airbag according to a fourth embodiment of the present invention.

FIG. 4 discloses a fourth embodiment of the present invention. The airbag 300 disclosed in FIG. 4 is similar in many respects to the airbag shown in FIG. 3. Similar parts are labeled with similar reference numerals for convenience.

The airbag 300, which is shown in FIG. 4 in the spread out, non inflated state, comprises two layers of material 324 which are sewn together. The layers of material 324 may also be referred to as lobes or panels. The layers 324 may include an extending section 329 at one end. The extension 329 may be configured to include the connecting holes 280 for attaching the air bag to the vehicle. As a result of the different configuration of the material for the airbag, the end chamber 379, shown in FIG. 4, may be configured differently from the embodiment shown in FIG. 3.

The various features of the above described embodiments may be incorporated in whole or in part to configure an airbag suitable for use in a particular vehicle. Thus, it is possible to combine a particular chamber from one embodiment with a chamber from another embodiment to arrive at a suitable airbag arrangement for a particular use or purpose.

Furthermore, given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention is to be defined as set forth in the following claims.

We claim:

1. An inflatable airbag for a motor vehicle comprising:
   a main chamber configured to be connected to a gas generator;
   a plurality of spherically shaped chambers, wherein each of the spherically shaped chambers includes a separate gas inlet, for receiving gas for inflation such that the spherically shaped chambers are inflatable independently of one another, and
   wherein when the airbag is inflated at least a portion of the main chamber covers a side wall of the vehicle.

2. The inflatable airbag of claim 1, further comprising:
   an additional airbag region configured to form a downward extending chamber when inflated, the extending chamber extending downwardly below a lower window boundary of the vehicle side wall.

3. The inflatable airbag of claim 2, further comprising:
   a pair of layers of material which are sewn together, and
   wherein the boundaries of the main chamber and the downward extending chamber are formed by a sewn seam.

4. The inflatable airbag of claim 3, wherein the seam that forms the boundaries of both the main chamber and the downwardly extending chamber is a single common seam.

5. The inflatable airbag of claim 1, wherein each of the spherically shaped chambers is configured to receive gas for inflation from the main chamber through the separate gas inlet.

6. The inflatable airbag of claim 1, wherein the main chamber comprises a strip shaped constriction.

7. The inflatable airbag of claim 6, wherein the constriction connects with the boundary of the main chamber.

8. The inflatable airbag of claim 6, wherein the constriction is a quilting in the form of an approximately U-shaped seam.

9. The inflatable airbag of claim 8, wherein the quilting connects to a seam which forms the boundary of the main chamber and is incident to the seam at an angle between approximately 45 to 90 degrees.

10. The inflatable airbag of claim 8, wherein an approximately circular seam is connected to an end of the U-shaped seam.

11. The inflatable airbag of claim 1, wherein each of the spherically shaped chambers is configured to receive gas from a narrow main chamber section through the separate gas inlet.

12. An inflatable airbag for a motor vehicle comprising:
    a main chamber configured to be connected to a gas generator;
    wherein when the airbag is inflated at least a portion of the main chamber covers a side wall of the vehicle;
    an additional airbag region configured to form an approximately spherically shaped chamber when inflated;
    wherein the spherically shaped chamber is connected via an outlet region to a downward extending chamber which extends below a lower window boundary of the vehicle side wall.

13. The inflatable airbag of claim 12, wherein the spherically shaped chamber is configured so that in an inflated state the volume of the spherically shaped chamber is smaller than the volume of the main chamber.

14. The inflatable airbag of claim 12, further comprising:
    a pair of layers of material which are sewn together; and
    and wherein the boundaries of the main chamber and of the spherically shaped chamber are formed by a sewn seam.

15. The inflatable airbag of claim 14, wherein the seam that forms the boundaries of both the main chamber and the spherically shaped chamber is a single common seam.

16. The inflatable airbag of claim 14, wherein the seam that forms the boundary of the spherically shaped chamber is at least generally circular and is interrupted for forming a gas inlet.

17. The inflatable airbag of claim 12, further comprising:
    a second additional airbag region configured to form a downward extending chamber when inflated, the extending chamber extending downwardly below a lower window boundary of the vehicle side wall.

18. The inflatable airbag of claim 12, wherein the downward extending chamber can be inflated only via the spherically shaped chamber.

* * * * *